(12) United States Patent
Kawakami et al.

(10) Patent No.: US 6,560,231 B1
(45) Date of Patent: May 6, 2003

(54) MULTIPLEX TRANSMISSION SYSTEM AND BANDWIDTH CONTROL METHOD

(75) Inventors: Hiroshi Kawakami, Kanagawa (JP); Hiroki Morikawa, Kanagawa (JP); Fumiaki Ishino, Tokyo (JP)

(73) Assignee: NTT Mobile Communications Network, Inc., Tokyo (JP)

( * ) Notice: Subject to any disclaimer, the term of this patent is extended or adjusted under 35 U.S.C. 154(b) by 0 days.

(21) Appl. No.: 09/147,911

(22) PCT Filed: Jul. 22, 1998

(86) PCT No.: PCT/JP98/03279

§ 371 (c)(1),
(2), (4) Date: Jul. 23, 1999

(87) PCT Pub. No.: WO99/05827

PCT Pub. Date: Feb. 4, 1999

(30) Foreign Application Priority Data

Jul. 23, 1997 (JP) .............................................. 9-196982

(51) Int. Cl.[7] .......................... H04L 12/28; H04L 12/56
(52) U.S. Cl. ................... 370/395.43; 370/412; 370/468
(58) Field of Search ................................. 370/229, 230, 370/230.1, 235, 395.1, 395.2, 395.21, 395.3, 395.4, 395.41, 395.42, 395.43, 412, 428, 468, 413–418, 535–538

(56) References Cited

U.S. PATENT DOCUMENTS

| 5,268,900 A | * | 12/1993 | Hluchyj et al. | 370/412 |
|---|---|---|---|---|
| 5,862,126 A | * | 1/1999 | Shah et al. | 370/230 |
| 5,898,670 A | * | 4/1999 | Hoebeke et al. | 370/468 |
| 5,909,443 A | * | 6/1999 | Fichou et al. | 370/412 |
| 5,982,748 A | * | 11/1999 | Yin et al. | 370/232 |
| 6,046,981 A | * | 4/2000 | Ramamurthy et al. | 370/232 |
| 6,061,354 A | | 5/2000 | Morikawa | 370/395 |
| 6,262,986 B1 | * | 7/2001 | Oba et al. | 370/399 |

FOREIGN PATENT DOCUMENTS

| JP | 05-3488 | 1/1993 |
|---|---|---|
| JP | 06-104917 | 4/1994 |
| JP | 07079226 | 3/1995 |
| JP | 07123099 | 12/1995 |
| JP | 10-200547 | 7/1998 |

OTHER PUBLICATIONS

"A Quality Control in the ATM Switching System" by T. Soumiya et al. at Fujitsu Laboratories Ltd. Fujitsu Ltd. in Technical Report of The Institute of Electronics, Information and Communication Engineers, SSE95–59, Sep. 28, 1995.

(List continued on next page.)

*Primary Examiner*—Ajit Patel
(74) *Attorney, Agent, or Firm*—Brown Raysman Millstein Felder & Steiner

(57) ABSTRACT

A multiplex system for multiplexing packets into ATM cells to be transmitted, which can implement effective use of channels corresponding to irregular traffic qualities in services with various types of quality conditions in an actual environment. In response to a connection establishment request (S402), current required bandwidths B1, . . . , Bm are changed to B'1, . . . , B'm by adding the new connection, which causes bandwidths X1, . . . , Xm which are assigned to the channels to be changed. When the desired bandwidth including the requested connection is less than an available bandwidth of the corresponding channel, an assigned bandwidth change processing (S406) is activated to assign new bandwidths in accordance with desired bandwidths. The bandwidth assignment change is carried out by changing ratios of extraction rates of packets from the buffers in the multiplex system.

16 Claims, 14 Drawing Sheets

OTHER PUBLICATIONS

"Control Ensuring Bandwidth Using AAL Type2 For Mobile ATM Network" by H. Kawakami et al. at NTT Mobile Communications Network Inc. at 1997 General Meeting of The Institute of Electronics, Information, and Communication Engineers, B-5-209, Mar. 6, 1997.

"Realtime Voice Communications Over ATM" by F. Fujiya et al. at NTT Network Service Systems Laboratories in Technical Report of The Institute of Electronics, Information and Communication Engineers, IN97-62, Jul. 18, 1997.

"A Study of Mini Cell Multiplex Using AAL Type2" by H. Ono et al. at Fujitsu Laboratories Ltd. at 1998 General Meeting of the Institute of Electronics, Information, and Communication Engineers, B-6-27, Mar. 6, 1998.

* cited by examiner

MULTIPLEX TRANSMISSION SYSTEM AND BANDWIDTH CONTROL METHOD

TECHNICAL FIELD

The present invention relates to ATM transmission, and more particularly to a bandwidth control method in the ATM transmission that can fulfill required service qualities in the transmission.

BACKGROUND ART

Generally, an ATM transmission system multiplexes cells with different quality conditions such as delay and a cell loss ratio, and transmits them through an output transmission path. To achieve such transmission, it is necessary for each quality class to have a plurality of buffers at a stage previous to the multiplexing.

The ATM transmission system also multiplexes packets with different quality conditions into ATM cells to be transmitted. To achieve such transmission, it is also necessary for each quality class to have a plurality of buffers at a stage previous to the multiplexing into the ATM cells.

Besides, there is an ATM transmission technique that multiplexes packets from a plurality of users into ATM cells to be transmitted. ATM adaptation layer type 2 (AAL type 2) can multiplex a maximum of 248 users into a single virtual channel (VC) connection to be transmitted. Since the quality class is usually required for each user connection, a plurality of quality classes must be prepared in the VC connection so that the transmission is carried out with the quality that meets the requirement of each user connection.

A system configuration for multiplexing packets consisting of a plurality of connections into ATM cells is disclosed, for example, in "Multiplex Transmitter for Micro-frame", an international application filed by the assignee of the present application (International Publication No. WO97/23975 published Jul. 3, 1997). Its disclosure has a plurality of buffers for each quality class, distributes to the buffers packets input to the multiplex transmitter, and extracts the packets from the buffers in predetermined order, thereby achieving transmission according to the quality classes.

In this case, the bandwidth to be assigned to each quality class is decided from the rate of extracting the cells or packets from the buffers of each quality class, to which they are delivered. However, establishment of a requested user connection sometimes becomes impossible because of the limited bandwidth set for each quality class, even if the total bandwidth of the transmission path has some leeway.

As described above, a system configuration is already present which enables the transmission of different qualities by loading a plurality of buffers with packets with different quality conditions such as delay and cell loss ratios, and by multiplexing them into ATM cells, in which the bandwidth of the transmission path is allotted to respective quality classes.

Generally, bandwidth ratios of respective quality classes are determined from traffic qualities estimated at the start of the multiplex system, and the packets or cells are extracted at the rates that meet the determined bandwidth ratios. However, estimating actual traffic qualities is not easy, and hence it is not unlikely that the bandwidth required for transmission can exceed the bandwidth assigned to the current quality class even if there is some bandwidth margin in the transmission path in its entirety. Thus, the connection establishment request is rejected because of the limited assigned bandwidth which cannot satisfy the service quality needed for the transmission. However, if the established bandwidth ratios can be changed, the transmission that fulfills the service quality can be achieved, enabling more connections to be accepted with maintaining small delay and cell loss ratios.

DISCLOSURE OF THE INVENTION

It is therefore an object of the present invention is to implement efficient use of a transmission path in response to irregular traffic qualities of various types of services with different quality conditions in an actual environment by providing a multiplex system, which outputs multiplexed information to a transmission path, with bandwidth change control.

To accomplish the foregoing object, the present invention provides a multiplex transmission system for carrying out multiplex transmission of ATM cells, the multiplex transmission system comprising: separate buffers, each allotted to one of quality classes, wherein accepting separately in the buffers transmission contents from a plurality of connections; changing extraction rates from the buffers; and changing allotments of bandwidths to be assigned to channels of respective quality classes by changing the extraction rates.

The transmission contents from a plurality of connections can consist of ATM cells or packets In the case of packets, they are extracted from the buffers, and multiplexed into ATM cells to be output. The system can be configured as a combination of them.

Allotments of bandwidths assigned to channels associated with respective quality classes can be changed when a request is made for establishing a new connection.

In addition, the allotments of bandwidths assigned to channels associated with respective quality classes can be changed when a request is made for releasing a currently communicating connection.

The allotments of bandwidths assigned to channels associated with respective quality classes can be changed when a request is made for establishing a new connection, and a bandwidth which is required for a quality class associated with the new connection after adding the new connection exceeds a bandwidth which has been assigned to the quality class associated with the new connection.

Furthermore, the allotments of bandwidths assigned to channels associated with respective quality classes can be changed when any one of cell loss ratios which are monitored for respective quality classes exceed a predetermined value.

The multiplex system with the foregoing configurations can implement the effective use of the transmission path.

BEST MODE FOR CARRYING OUT THE INVENTION

Embodiments of the present invention will now be described with reference to the accompanying drawings.

Figure 1:
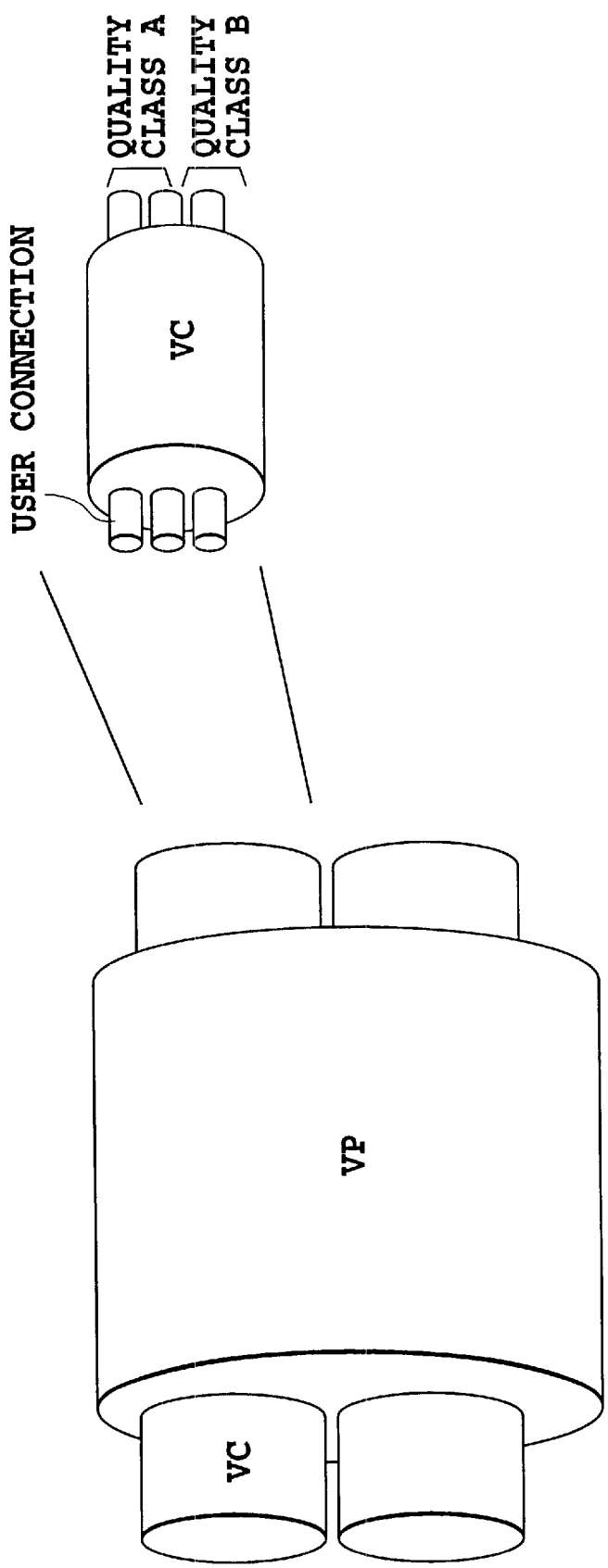
FIG. 1 is a diagram showing relationships between a virtual path connection, virtual channel connection and user connection.

FIG. 1 is a diagram showing relationships between a virtual path connection (VP), virtual channel connections (VCs) and user connections. Virtual connections based on ATM cells are present in the virtual connections on a physical transmission path. The virtual connections can represent the user connections, or can multiplex packets constituting the user connections onto ATM cells consisting of the virtual connections to transmits the packets. In FIG. 1, a plurality of user connections are established on the virtual connections. The present invention dynamically controls the bandwidths of the user connections consisting of the virtual connections based on the ATM cells, and the bandwidths of the user connections based on packets multiplexed on the ATM cells, so that they fulfill the service qualities of respective levels.

Figure 2:
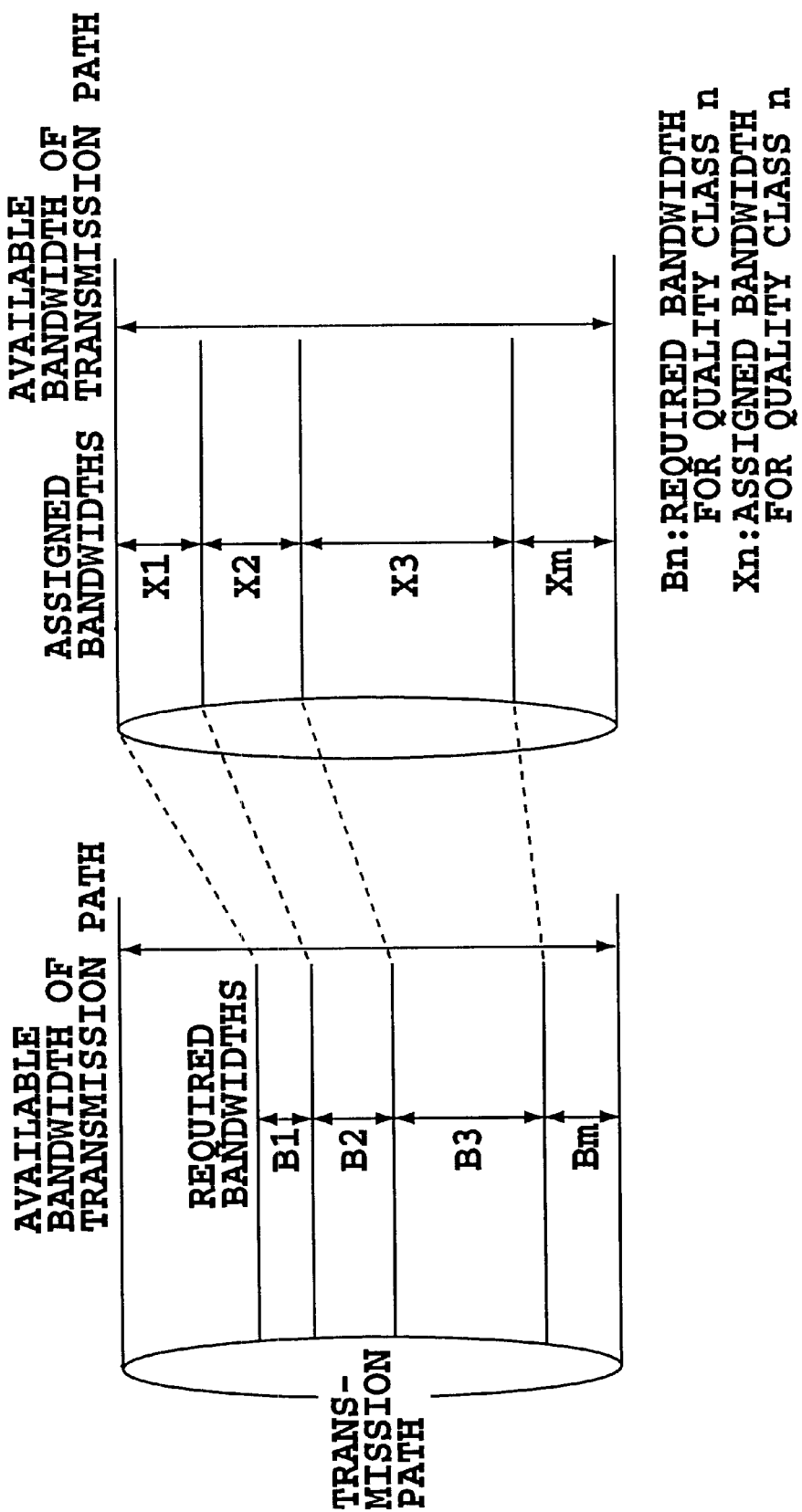
FIG. 2 is a schematic diagram comparing required bandwidths for respective quality classes and assigned bandwidths actually assigned to channels for respective quality classes.

FIG. 2 is a schematic diagram comparing required bandwidths for respective quality classes and assigned bandwidths actually allotted to a transmission path (virtual path connection and virtual channel connections) for respective quality classes. As shown in FIG. 2, if the sum total of the bandwidths B1–Bm required for the quality classes is less than the available bandwidth of the transmission path, the bandwidths assigned to the channels have a margin. Therefore, optimum bandwidth assignment can be achieved by dynamically controlling the bandwidth assignment to the channels. The multiplex system described below carries out the optimum bandwidth assignment.

Figure 3:
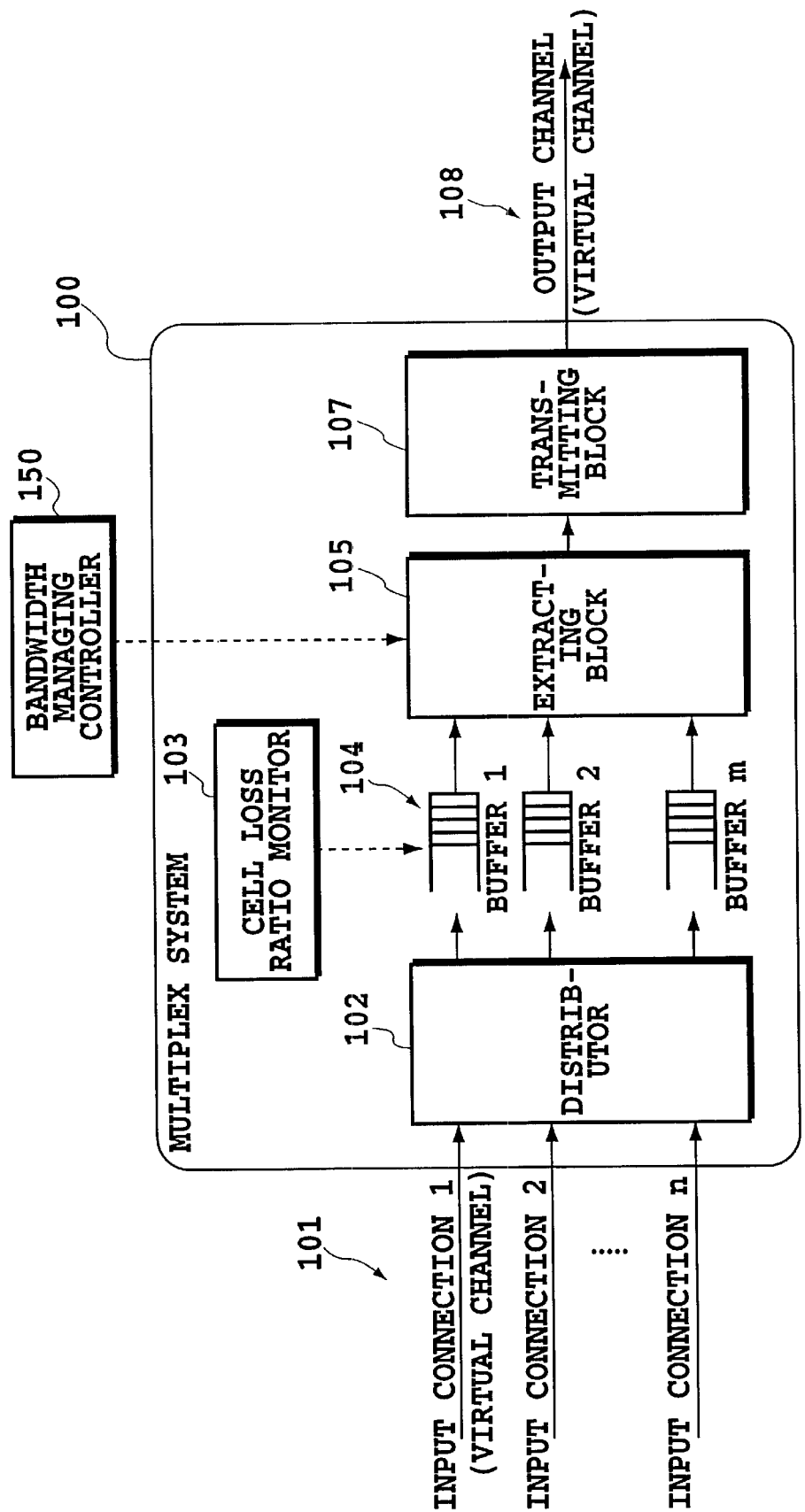
FIG. 3 is a block diagram showing a configuration of a multiplex system for multiplexing ATM cells to be transmitted through a transmission path.

FIG. 3 is a block diagram showing a configuration of a multiplex system 100 for multiplexing ATM cells constituting connections requiring different service qualities, and for transmitting them through a transmission path (virtual path connections).

Cells that are input to a multiplex system 100 through input connections 1-n 101 have their own quality conditions. These packets are delivered by a distributor 102 to buffers 104 in accordance with quality classes.

The buffers 104 have shared waiting times set in advance based on quality conditions for outputting the cells, thereby sequentially discarding packets that exceed allowed waiting times. A cell loss ratio monitor 103 has a function to monitor discard rates of the cells in the buffers 104. A bandwidth managing controller 150 decides, from the ratios of the bandwidths assigned to the quality classes, optimum ratios of the extraction rates from the buffers, and supplies an extracting block 105 with extraction information that designates the buffer from which the cell is to be extracted. The extracting block 105 extracts the cell in accordance with the extraction information supplied. The ATM cell extracted is sent to an output channel 108 through a transmitting block 107.

Figure 4:
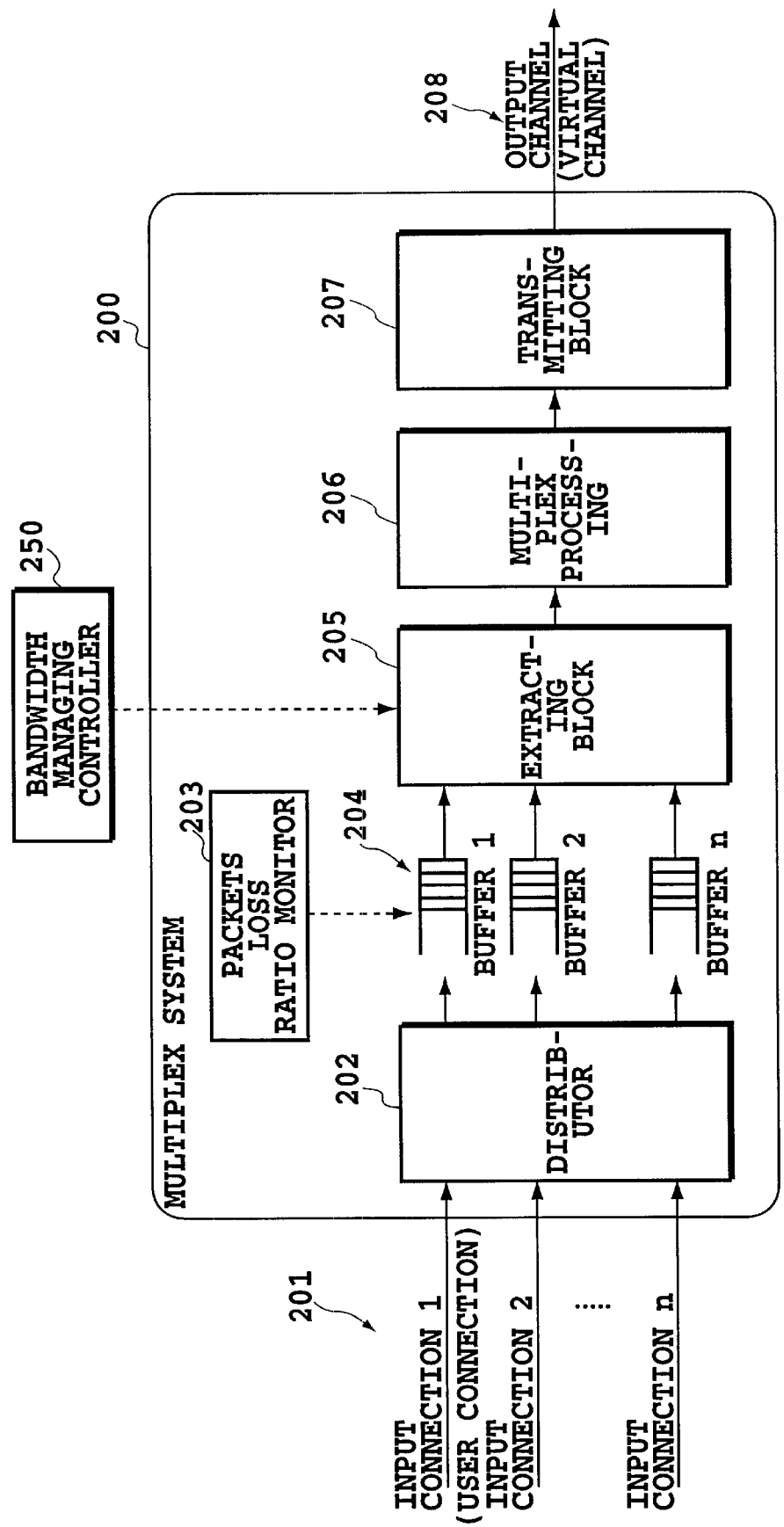
FIG. 4 is a block diagram showing a configuration of a multiplex system for multiplexing packets into ATM cells to be transmitted through a transmission path.

FIG. 4 is a block diagram showing a configuration of a multiplex system 200 that multiplexes packets constituting different user connections into ATM cells constituting virtual channel connections to be transmitted.

Packets that are input to the multiplex system 200 through input connections 1-n 201 have their own quality conditions. These packets are delivered by a distributor 202 to buffers 204 in accordance with quality classes.

The buffers 204 have shared waiting times set in advance based on quality conditions for multiplexing the packets, thereby sequentially discarding packets that exceed allowed waiting times. A bandwidth managing controller 250 has a function to monitor discard rates of the packets in the buffers 204. A bandwidth managing controller 250 decides, from the ratios of the bandwidths assigned to the quality classes, optimum ratios of the extraction rates from the buffers, and supplies an extracting block 205 with extraction information that designates the buffer from which the packets are to be extracted. The extracting block 205 extracts the packets in accordance with the extraction information supplied, and a multiplex processing unit 206 multiplexes the extracted packets into the ATM cells. The ATM cells multiplexed are sent to an output channel 208 through a transmitting block 207.

Figure 5:
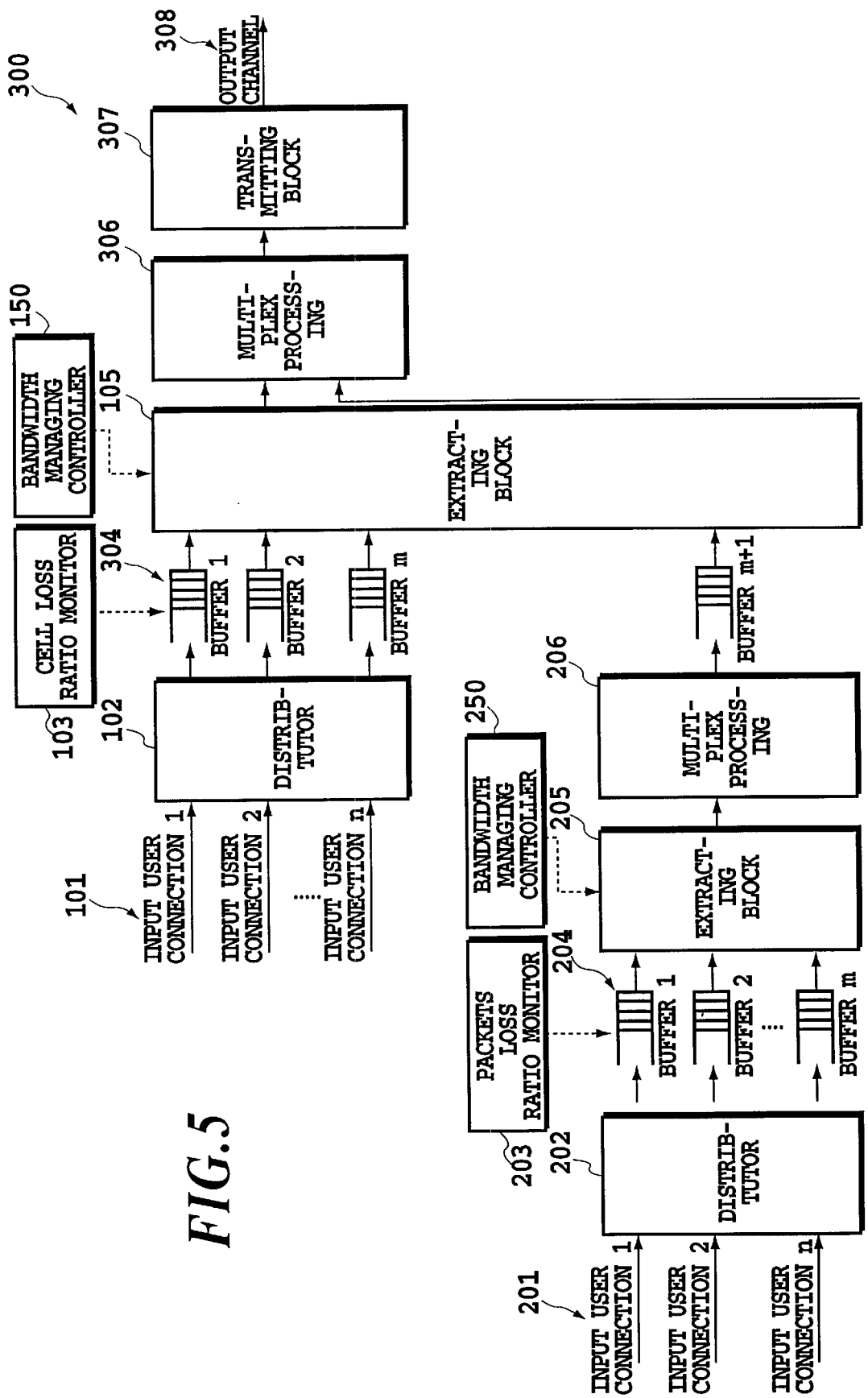
FIG. 5 is a block diagram showing a configuration of a multiplex system for carrying out multiplexing of FIG. 3 and that of FIG. 4 at the same time.
Figure 6:
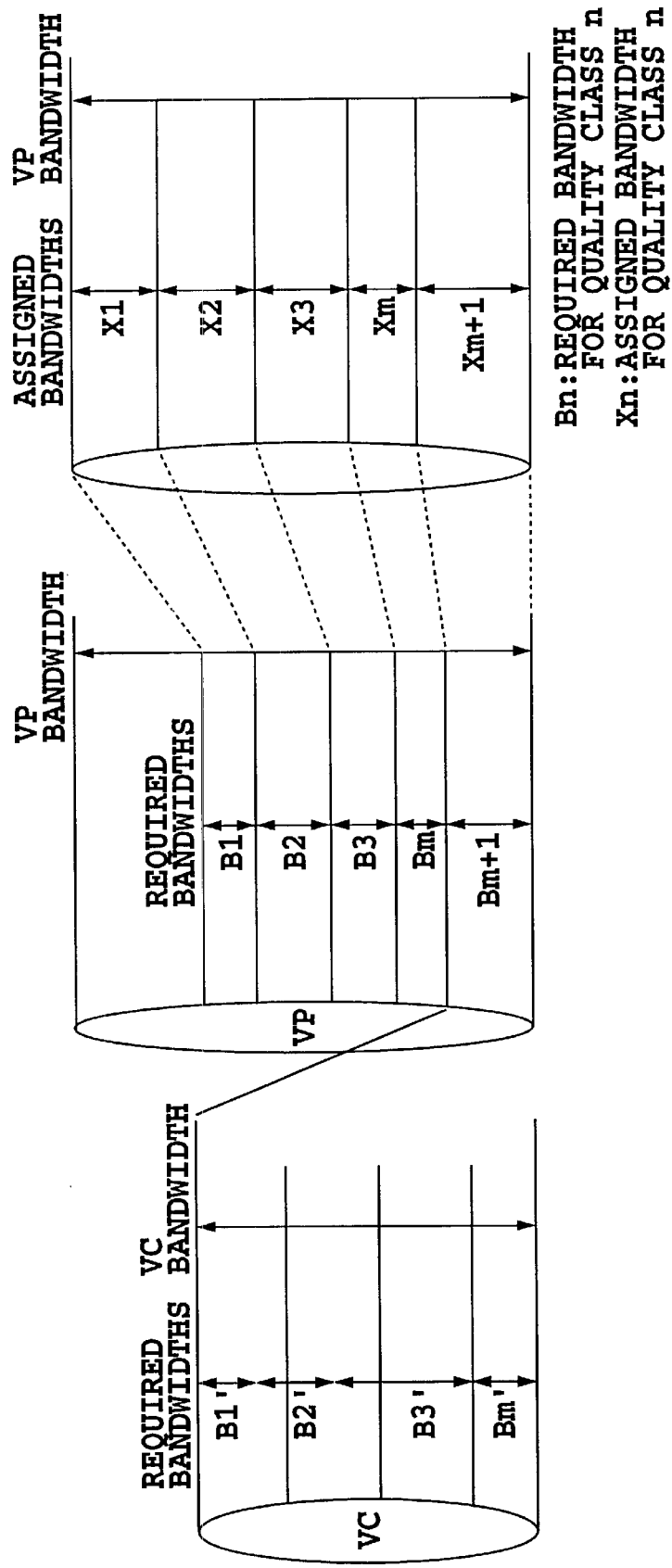
FIG. 6 is a schematic diagram showing assigned bandwidths in the multiplex system of FIG. 5.

FIG. 5 is a block diagram showing a configuration of a multiplex system 300 for carrying out the multiplexing of FIGS. 3 and 4 at the same time, and FIG. 6 is a schematic diagram showing assigned bandwidths in the multiplex system of FIG. 5. In FIG. 5, the blocks designated by the same reference numerals as those of FIGS. 3 and 4 have the same functions.

In FIG. 5, the user connections 101 constitute connections for ATM cells, and the packets supplied from the user connections 201 are multiplexed through the distributor 202, buffers 204, extracting block 205 and multiplex processing unit 206 as described in connection with FIG. 4. The ATM cells into which the packets are multiplexed are stored in a buffer m+1 in buffers 304. The ATM cells stored in the buffer m+1 are extracted together with other ATM cells from the buffers 304 by the extracting block 105 at the ratios of the extraction rates corresponding to the assigned bandwidths. The ATM cells extracted are multiplexed with other ATM cells by a multiplex processing unit 306 as needed, and are output to an output channel 308 through a transmitting block 307.

In this case, a bandwidth managing controller 250 controls the ratios of the extraction rates of the packets from the buffers 204 such that the user channels have virtual channel (VC) bandwidths B1'–Bm' as illustrated in FIG. 6. In addition, a bandwidth managing controller 150 controls the ratios of the extraction rates of the ATM cells from the buffers 304 such that the ratios have virtual path connection (VP) bandwidths X1–Xm+1 as illustrated in FIG. 6.

Although the packets are multiplexed into the single virtual channel connection in FIGS. 5 and 6, a configuration can be arranged in which the packets are multiplexed into a plurality of virtual channel connections. In this case, the components 201–206 and the buffer (m+1) are installed by the number of the virtual channel connections.

Figure 7:
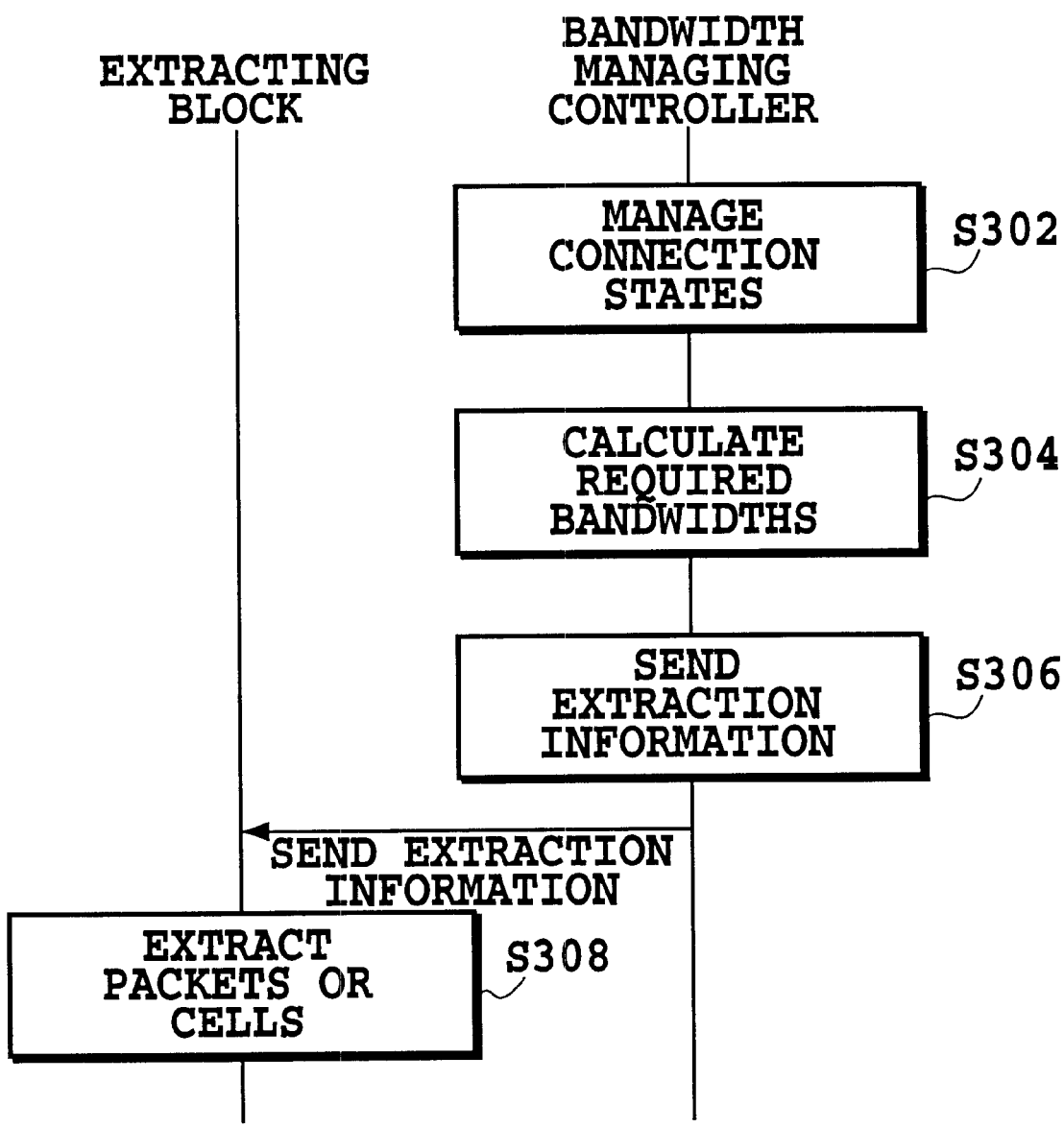
FIG. 7 is a diagram showing sequence of processings by a bandwidth managing controller and an extracting block.

FIG. 7 is a diagram showing a sequence associated with the processings of the bandwidth managing controllers 150 and 250 and extracting blocks 105 and 205 in FIGS. 3–5.

In FIG. 7, the bandwidth managing controllers 150 and 250 each manage the connections for respective quality classes (S302), determine the bandwidths (B1'–Bm' and B1–Bm) required for respective quality classes using conversion data or conversion algorithm prepared in advance (S304), and assign the required bandwidths decided as available bandwidths of the transmission path. The assigned bandwidths (X1–Xm) actually allotted to the transmission path usually have a bandwidth equal to or greater than the required one as shown in FIGS. 2 and 6 to fulfill the quality conditions. The assigned bandwidth ratios are converted into the extraction information (S306). The extracting blocks 105 and 205 in the multiplex system each carry out the extraction in accordance with the extraction information sent from the bandwidth managing controller 150 (S308), thereby ensuring the bandwidths of the respective quality classes. This in turn ensures the quality of the connections or packets. The bandwidths thus ensured can be altered by changing the extraction information by the bandwidth managing controllers 150 and 250.

The bandwidth managing controllers 150 and 250 can be installed either outside the multiplex system (for example, in an ATM switching system), or inside the multiplex system. Alternatively, they can be separately placed inside and outside the multiplex system. In FIGS. 3–5, they are positioned outside the multiplex system, and their functions as well as those of the multiplex system are implemented by computers (not shown).

Various types of control can be achieved in the multiplex systems 100, 200 and 300 as shown in FIGS. 3–5 by varying the trigger of the bandwidth change processing. The control processing will now be described in the following control examples whose fundamental structures are those of FIGS. 3–5.

(Control Example 1)

Figure 8:
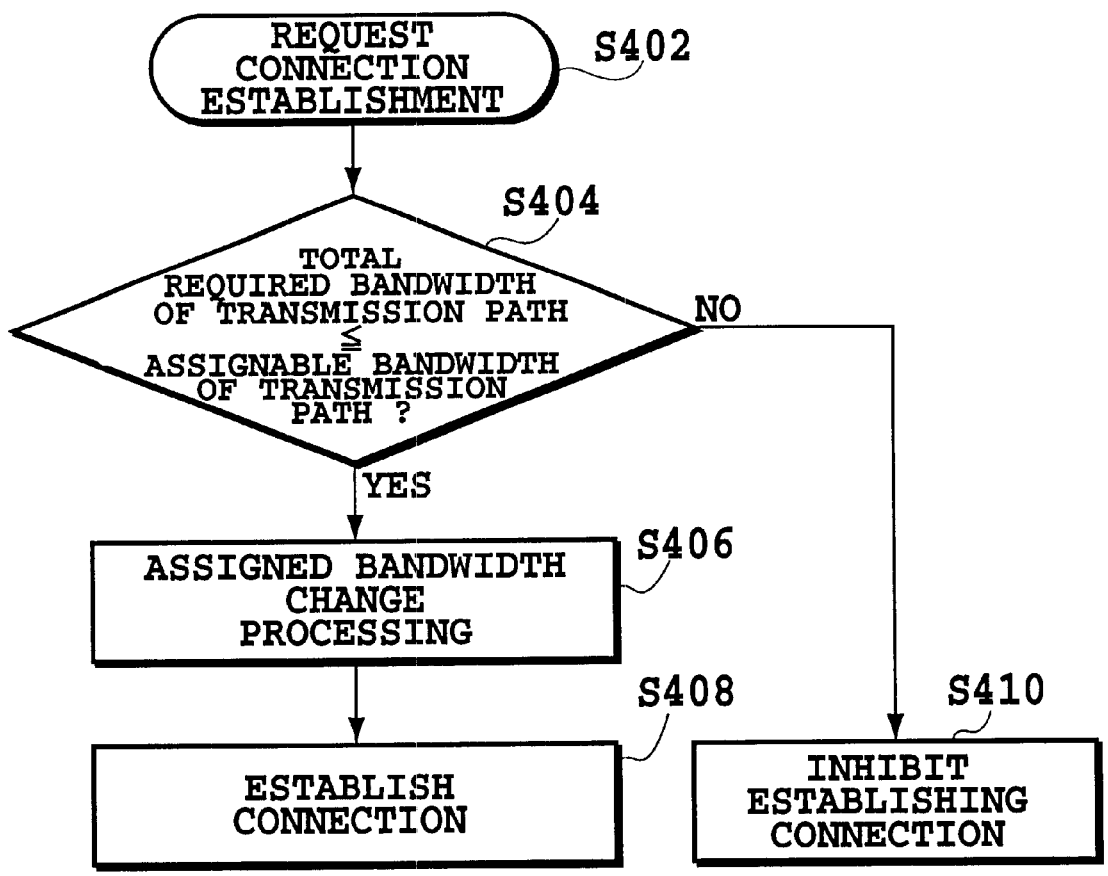
FIG. 8 is a flowchart illustrating a processing of the bandwidth change control in a connection establishing operation.
Figure 9:
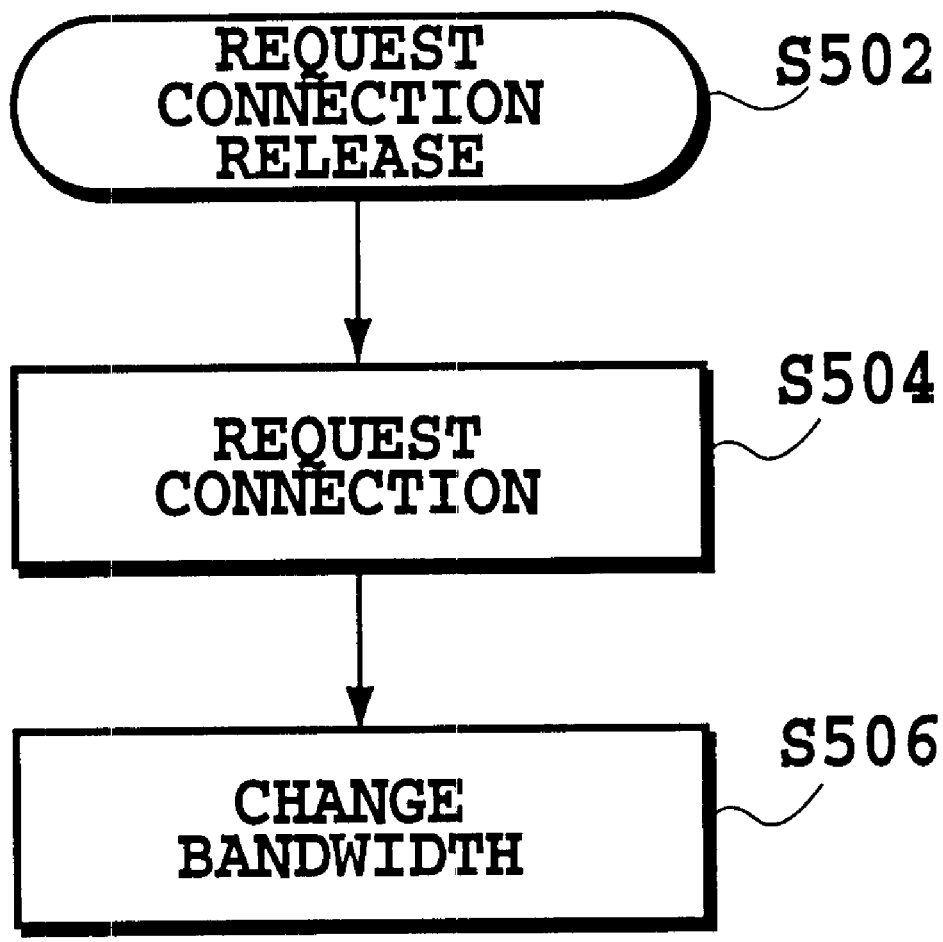
FIG. 9 is a flowchart illustrating a processing of the bandwidth change control in a connection release operation.
Figure 10:
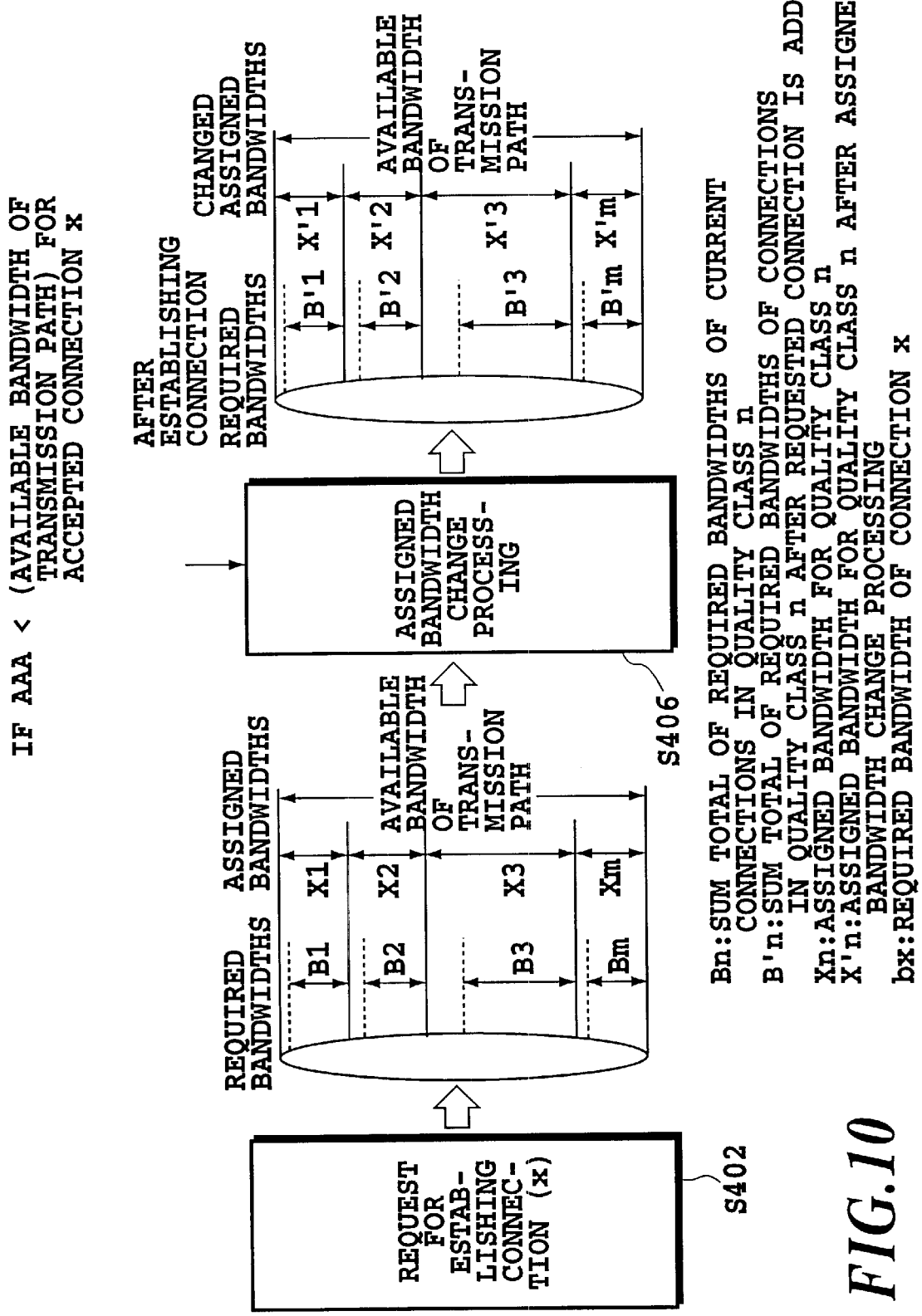
FIG. 10 is a diagram showing required bandwidths before and after the connection establishment, and bandwidths that have already been assigned to the transmission path and bandwidths that are assigned after an assigned bandwidth change processing.

FIGS. 8–10 are diagrams illustrating the operation of the control example 1 which carries out the bandwidth change processing by the bandwidth managing controller 150 or 250 each time the connection is established.

FIG. 8 is a flowchart illustrating a processing of the bandwidth change control when establishing the connection, FIG. 9 is a flowchart illustrating a processing of the bandwidth change control when releasing the connection, and FIG. 10 is a diagram showing required bandwidths before and after the connection establishment, and bandwidths that have already been assigned to the channel and bandwidths assigned after the bandwidth change processing in the control example 1.

In FIG. 8, receiving a request for establishing a connection (S402), the bandwidth managing controller 150 calculates a total required bandwidth of the transmission path which is needed for the transmission after adding to the currently established connections the connection to be established according to the request. The bandwidth (bx) required for each connection can be decided from the quality conditions such as the maximum cell rate, sustainable cell rate, minimum cell rate, cell transfer delay, cell delay variation and cell loss ratio. The calculation method of the required bandwidths (B1–Bm) for respective quality classes can be one that sums up the required bandwidths for respective connections, or one that obtains them using conversion data or conversion algorithm between the connections and the required bandwidths considering the statistical multiplexing effect in making a plurality of connections. The total required bandwidth of the transmission path can be obtained as the sum total of the required bandwidths calculated for respective quality classes. The total required bandwidth of the transmission path is compared with the available bandwidth of the transmission path assignable to the transmission path (S404), and if the former does not exceed the latter, the bandwidths (X1–Xm) assigned to the quality classes are converted into the optimum bandwidth ratios (X'1–X'm) under the condition in which the new connection is added (S406). Thus, the requested connection is established (S408). Since the assigned bandwidths of the quality classes after the change are equal to or greater than the required bandwidths in this case, the service quality can be ensured of the established connection and currently communicating connections. If the total required bandwidth of the transmission path exceeds the available bandwidth, the connection establishment is rejected (S410) to ensure the service quality of the currently communicating connections.

In FIG. 9, receiving a request for releasing a connection (S502), the bandwidth managing controller 150 releases the transmission path associated with the connection release, and reassigns the bandwidth which has been assigned to the transmission path (S506).

FIG. 10 is a diagram showing as in FIG. 4 the required bandwidths before and after the connection establishment by the processing of FIG. 8, and bandwidths that have already been assigned to the transmission path and bandwidths assigned after the assigned bandwidth change processing.

In FIG. 10, in response to the connection establishment request in FIG. 8 (S402), the current required bandwidths B1, . . . , Bm as shown in FIG. 10 are changed to the required bandwidths B'1, . . . , B'm by adding the new connection. Thus, the currently assigned bandwidths X1, . . . , Xm as shown in FIG. 10 are to be changed, and if the required bandwidth considering the requested connection is less than the available bandwidth of the transmission path, the assigned bandwidth change processing is activated (S406). Thus, the bandwidths after the change are assigned as shown in FIG. 10.

The control example 1 described above carries out the bandwidth change processing each time the connection is established. Although this enables the transmission using the optimum assigned bandwidths, the load of the processing can be reduced by carrying out the bandwidth change processing at intervals a predetermined number of connections are accepted or at every fixed interval. In this case, although the required bandwidths can temporarily exceed the assigned bandwidths, this does not necessarily lead to the degradation in the service quality because if no packet with the intended quality is present when extracting the packet from the buffer to the assigned band, a packet with other quality can be extracted instead.

The connection is released in response to the connection release request, and the assigned bandwidths are optimized by changing the assigned bandwidths of the quality classes to the optimum bandwidth ratios using the same calculating method as in the connection establishment.

(Control Example 2)

The processing load can be reduced with maintaining the service quality by carrying out the bandwidth change processing or the calculation of the total required bandwidth of the transmission path only when the required bandwidth of the quality classes associated with the establishment requested connection exceeds the assigned bandwidth. Such processing is implemented in the control example 2, which will now be described in detail with reference to FIGS. 11 and 12.

Figure 11:
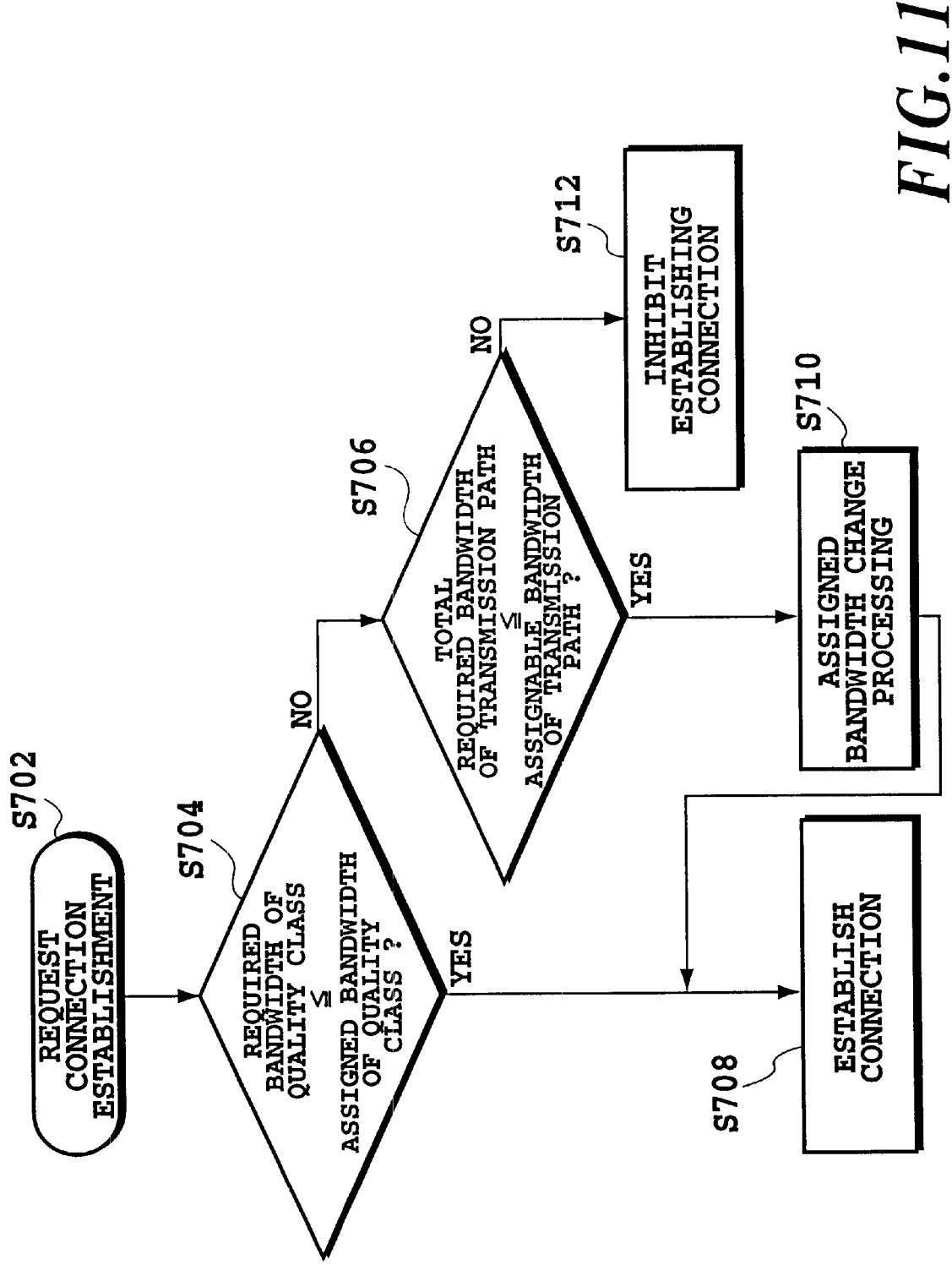
FIG. 11 is a flowchart illustrating another processing of the bandwidth change control in the connection establishing operation in another embodiment.
Figure 12:
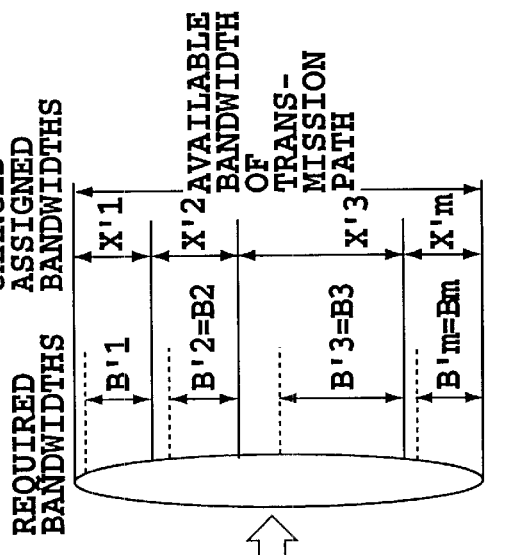
FIG. 12 is a diagram showing required bandwidths before and after the connection establishment, and bandwidths that have already been assigned to the channel and bandwidths that are assigned after the assigned bandwidth change processing.
Figure 12:
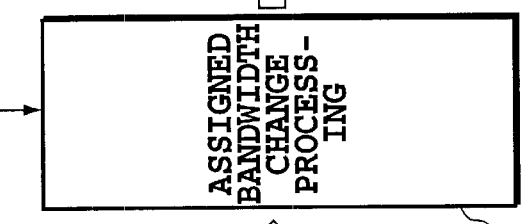
Figure 12:
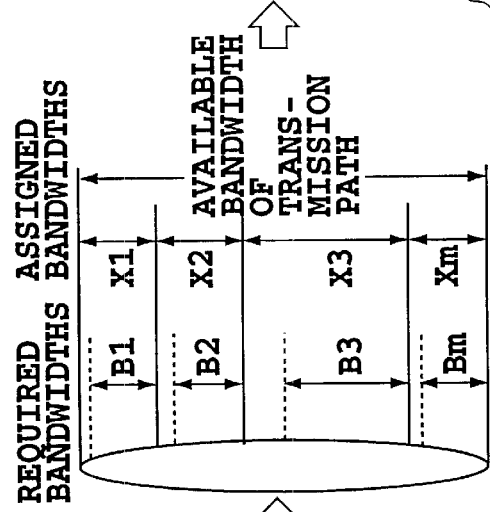

FIG. 11 is a flowchart illustrating a processing of the bandwidth change control when establishing the connection in the control example 2, and FIG. 12 is a diagram showing required bandwidths before and after the connection establishment, and bandwidths that have already been assigned to the channel and bandwidths that are allotted after the bandwidth change processing in the control example 2.

In FIG. 11, receiving a request for establishing a connection (S702), the bandwidth managing controller calculates a required bandwidth of the quality class of the connection after adding the connection to be established according to the request. The bandwidth (bx) needed for the connection can be decided from values reported at the connection establishment request such as the maximum cell rate, sustainable cell rate, minimum cell rate, cell transfer delay, cell delay variation and cell loss ratio.

The calculation method of the required bandwidths (B1–Bm) for respective quality classes can be one that sums up the bandwidths required for respective connections, or one that obtains them using conversion data or conversion algorithm between the connections and the required bandwidths considering the statistical multiplexing effect in making a plurality of connections. The required bandwidth (B'n) calculated is compared with the bandwidth (Xn) assigned to the transmission path for the instant quality class (S704), and if the former does not exceed the latter, the required connection is established (S708). Since the assigned bandwidth for each quality class is equal to or greater than the required bandwidth in this case, the service quality can be ensured of the established connection and currently communicating connections.

If the required bandwidth exceeds the assigned bandwidth, the bandwidth managing controller calculates the required bandwidths of the quality classes, and then the total required bandwidth of the transmission path. The total required bandwidth of the transmission path can be obtained as the sum total of the required bandwidths calculated for respective quality classes. The calculated total required bandwidth of the transmission path is compared with the available bandwidth of the transmission path assignable to the transmission path (S706), and if the former does not exceed the latter, the bandwidths (X1–Xm) assigned to the quality classes are converted into the optimum bandwidth ratios (X'1–X'm) when the new connection is added (S408). Since the bandwidths assigned to the quality classes after the change are equal to or greater than the required bandwidths in this case, the service quality can be ensured of the established connection and currently communicating connections. If the total required bandwidth of the transmission path exceeds the available bandwidth, the connection establishment is not permitted to ensure the service quality of the currently communicating connections.

FIG. 12 is a diagram showing, as FIG. 10, required bandwidths before and after the connection establishment, and bandwidths that have already been assigned to the transmission path and bandwidths that are assigned after the assigned bandwidth change processing of the control example 2.

In FIG. 12, it is assumed that the connection establishment request is directed to the quality class B1, for example (S702). As illustrated in FIG. 12, as for the quality class B1, the required bandwidth is nearly equal to the assigned bandwidth with little margin. However, there is a sufficient margin considering the other quality classes. Thus, the assigned bandwidth change processing is activated (S710) so that the bandwidth assignment is changed as illustrated in this figure.

Thus, the control example 2 can reduce the load of the processing with maintaining the service quality to be ensured by carrying out the bandwidth change processing or the calculation of the total required bandwidth of the transmission path only if the required bandwidth of the quality class associated with the establishment required connection exceeds the assigned bandwidth.

(Control Example 3)

In the present control example 3, the bandwidth managing controller 150 or 250 carries out the bandwidth change processing only when the cell loss ratio monitor 103 or 203 makes a request to them. This enables the reduction of the processing load with maintaining the service quality to be ensured. The control example 3 will now be described in detail with reference to FIGS. 13 and 14.

Figure 13:
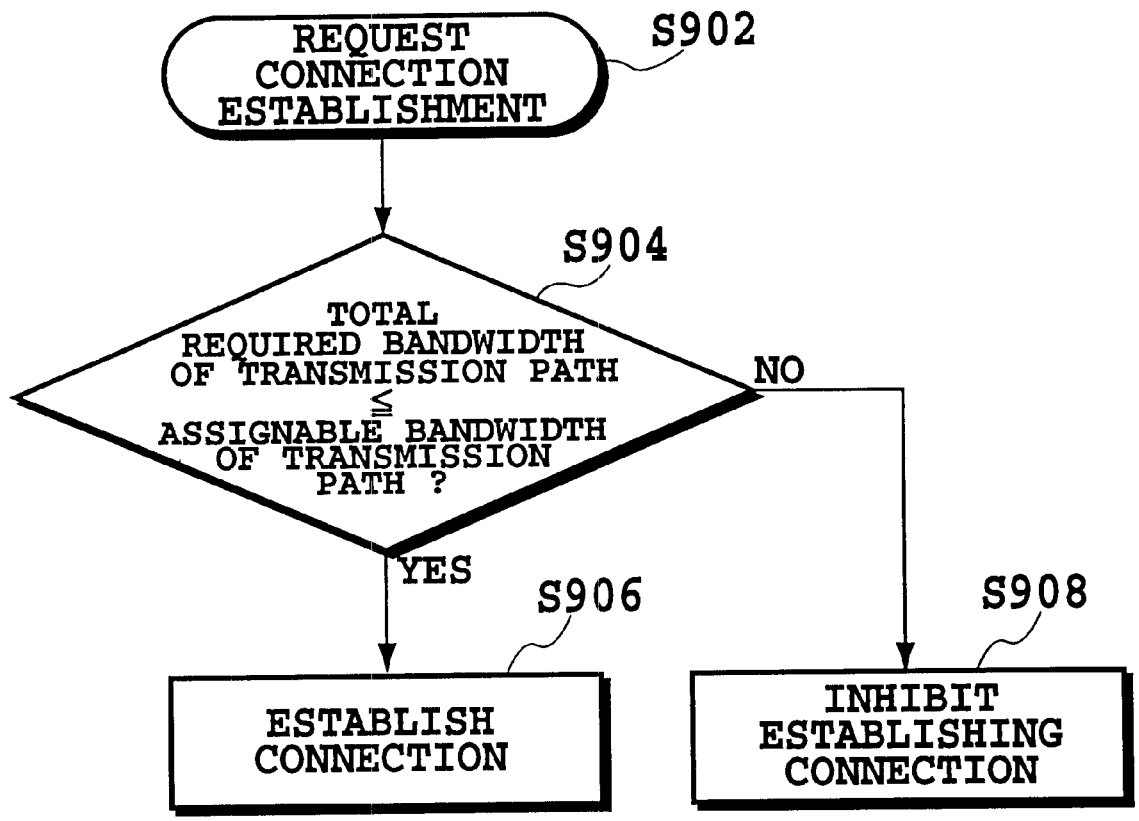
FIG. 13 is a flowchart illustrating a connection accept processing in the connection establishment in a third embodiment.
Figure 14:
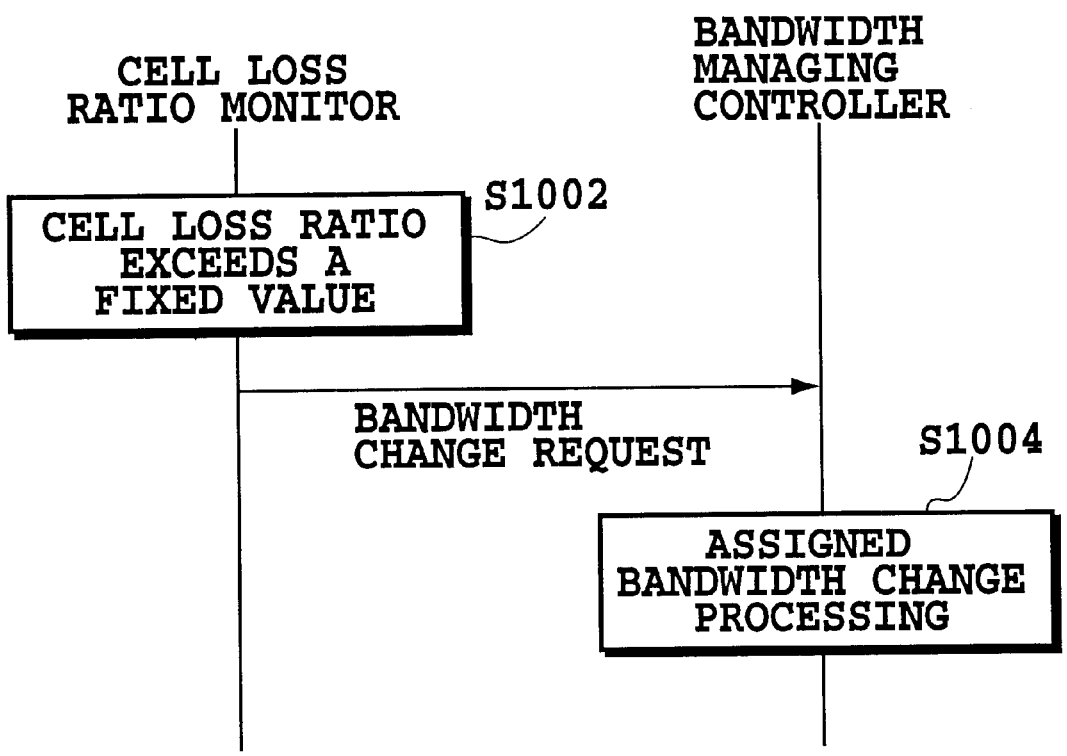
FIG. 14 is a diagram illustrating a process sequence from a cell loss ratio monitor to a bandwidth management controller for activating the bandwidth change processing.

FIG. 13 is a flowchart illustrating a connection accept processing in the connection establishment carried out by the bandwidth managing controller 150 or 250, and FIG. 14 is a diagram illustrating a process sequence of the cell loss ratio monitor 103 or 203 and bandwidth managing controller 150 or 250 for activating the bandwidth change processing in the control example 3.

In FIG. 13, receiving a request for establishing a connection, the bandwidth managing controller 150 or 250 calculates the total required bandwidth of the transmission path after adding to the currently established connections the connection to be established according to the request. The bandwidth (bx) required for the connection can be determined from values reported at the connection establishment request such as the maximum cell rate, sustainable cell rate, minimum cell rate, cell transfer delay, cell delay variation and cell loss ratio. The calculation method of the required bandwidths (B1–Bm) for respective quality classes can be one that sums up the bandwidths required for respective connections, or one that obtains them using conversion data or conversion algorithm between the connections and the required bandwidths considering the statistical multiplexing effect in making a plurality of connections. The total required bandwidth of the transmission path can be obtained as the sum total of the required bandwidths calculated for respective quality classes. The calculated total required bandwidth of the transmission path is compared with the available bandwidth of the transmission path assignable to the transmission path (S904), and if the former does not exceed the latter, the requested connection is established (S906). If the total required bandwidth of the transmission path exceeds the available bandwidth, the connection establishment is rejected (S908) to ensure the service quality of the currently communicating connections. The assignment change of the bandwidths is not carried out in the processing for the connection establishment request. The assigned bandwidth change processing will now be described with reference to FIG. 14.

In FIG. 14, the cell loss ratio monitor continually monitors the packet loss ratio of each buffer, and sends to the bandwidth managing controller the bandwidth change request if the packet loss ratio exceeds a predetermined threshold value (S1002). The threshold value is defined in connection with the service quality, and setting it less than the packet loss ratio of the service quality to be ensured makes it possible to ensure the service quality of the current connection. Receiving the bandwidth change request, the bandwidth managing controller calculates the required bandwidths of the respective quality classes, and changes the bandwidths assigned to the quality classes to the optimum bandwidth ratios (S1004).

As described above, the bandwidth managing controller carries out the bandwidth change processing only when the cell loss ratio monitor makes a request for the bandwidth change. This makes it possible to reduce the processing load with maintaining the service quality to be ensured.

Industrial Applicability

As described above, the present invention makes it possible in ATM transmission, which accepts in a plurality of separate buffers cells or packets with different quality conditions such as a delay and cell loss ratio, to change the bandwidths for the quality classes to be assigned to the transmission path by varying the extraction rates of the cells or packets from the buffers to the respective quality classes, thereby coping with the irregular traffic qualities of the services with various types of quality conditions in an actual environment.

Furthermore, it is always possible to assign the optimum bandwidth by changing the assigned bandwidths when establishing or releasing the user connection. It is also possible to reduce the load of the control processing with maintaining the service quality of the communications by changing the bandwidths only when the required bandwidth exceeds the bandwidth assigned to the quality class associated with the connection to be established. Moreover, the load of the control processing for changing the bandwidth can be further reduced with maintaining the service qualities of the communications by carrying out the bandwidth change processing at least when the cell or packet loss ratio exceeds the fixed threshold value while monitoring the actual cell or packet loss ratio.

What is claimed is:

1. A multiplex transmission system for carrying out multiple transmission of data, said multiplex transmission system comprising:
    a plurality of buffers prepared for a plurality of different quality classes;
    distribution means for distributing data from a plurality of connections to said buffers in accordance with quality classes of the data;
    control means for deciding, during data transmission, respective allotments of a bandwidth of a channel to be assigned to each of said quality classes, and corresponding respective extraction rates;
    extraction means for extracting the data from each of said buffers in accordance with the extraction rate decided by said control means; and
    transmission means for transmitting the data extracted by said extraction means to said channel.

2. The multiplex transmission system as claimed in claim 1, wherein:
    said data from the plurality of connections is in the form of ATM cells.

3. The multiplex transmission system as claimed in claim 1, wherein:
    said data from the plurality of connections is in the form of packets, and said multiplex transmission system further comprises multiplex means for multiplexing packets extracted by said extraction means into ATM cells.

4. The multiplex transmission system as claimed in claim 1, wherein:
    said data from the plurality of connections is in the form of ATM cells and packets,
    said buffers include buffers for ATM cells and buffers for packets,
    said multiplex transmission system further comprises multiplex means for multiplexing packets extracted by said extraction means into ATM cells, and
    an ATM cell into which packets are multiplexed by said multiplex means is input to one of the buffers for ATM cells.

5. The multiplex transmission system as claimed in any one of claims 1–4, wherein:
    said control means decides, when a request is made for establishing a new connection, for each of said quality classes, the allotment of the bandwidth of the channel to be assigned and the corresponding extraction rate.

6. The multiplex transmission system as claimed in any one of claims 1–4, wherein:
    said control means decides, when a request is made for releasing a presently established connection, for each of said quality classes, the allotment of the bandwidth of the channel to be assigned and the corresponding extraction rate.

7. The multiplex transmission system as claimed in any one of claims 1–4, wherein:
    said control means decides, when a request is made for establishing a new connection, and a bandwidth which is required for a quality class associated with the new connection after adding the new connection exceeds a bandwidth which is presently assigned to the quality class associated with the new connection, for each of said quality classes, the allotment of the bandwidth of the channel to be assigned and the corresponding extraction rate.

8. The multiplex transmission system as claimed in any one of claims 1–4, wherein said multiplex transmission system further comprises:
    monitor means for monitoring a data loss ratio of each of said quality classes, and said control means decides, when a data loss ratio of a quality class monitored by said monitor means exceeds a predetermined value, for each of said quality classes, the allotment of the bandwidth of the channel to be assigned and the corresponding extraction rate.

9. A bandwidth control method in a multiplex transmission system for carrying out multiple transmission of data, wherein a plurality of buffers are prepared for a plurality of different quality classes, said bandwidth control method comprising:
    a distribution step of distributing data from a plurality of connections to said buffers in accordance with quality classes of the data;
    a control step of deciding, during data transmission, respective allotments of a bandwidth of a channel to be assigned to each of said quality classes, and corresponding respective extraction rates;
    an extraction step of extracting the data from each of the buffers in accordance with the extraction rate decided in said control step; and
    a transmission step of transmitting the data extracted in said extraction step to said channel.

10. The bandwidth control method as claimed in claim 9, wherein:

said data from the plurality of connections is in the form of ATM cells.

11. The bandwidth control method as claimed in claim 9, wherein said data from the plurality of connections is in the form of packets, and said bandwidth control method further comprises:

a multiplex step of multiplexing packets extracted in said extraction step into ATM cells.

12. The bandwidth control method as claimed in claim 9, wherein said data from the plurality of connections is in the form of ATM cells and packets, the buffers include buffers for ATM cells and buffers for packets, said bandwidth control method further comprises:

a multiplex step of multiplexing packets extracted in said extraction step into ATM cells;

wherein an ATM cell into which packets are multiplexed in said multiplex step is input to one of the buffers for ATM cells.

13. The bandwidth control method as claimed in any one of claims 9–12, wherein:

said control step decides, when a request is made for establishing a new connection, for each of said quality classes, the allotment of the bandwidth of the channel to be assigned and the corresponding extraction rate.

14. The bandwidth control method as claimed in any one of claims 9–12, wherein:

said control step decides, when a request is made for releasing a presently established connection, for each of said quality classes, the allotment of the bandwidth of the channel to be assigned and the corresponding extraction rate.

15. The bandwidth control method as claimed in any one of claims 9–12, wherein:

said control step decides, when a request is made for establishing a new connection, and a bandwidth which is required for a quality class associated with the new connection after adding the new connection exceeds a bandwidth which is presently assigned to the quality class associated with the new connection, for each of said quality classes, the allotment of the bandwidth of the channel to be assigned and the corresponding extraction rate.

16. The bandwidth control method as claimed in any one of claims 9–12, wherein:

said bandwidth control method further comprises a monitor step of monitoring a data loss ratio of each of said quality classes, and said control step decides, when a data loss ratio of a quality class monitored in said monitor step exceeds a predetermined value, for each of said quality classes, the allotment of the bandwidth of the channel to be assigned and the corresponding extraction rate.

* * * * *